(12) United States Patent
Lopez et al.

(10) Patent No.: US 11,784,690 B2
(45) Date of Patent: Oct. 10, 2023

(54) TRANSMITTING A SYMBOL FROM A PLURALITY OF ANTENNAS

(71) Applicant: Telefonaktiebolaget LM Ericsson (publ), Stockholm (SE)

(72) Inventors: Miguel Lopez, Solna (SE); Leif Wilhelmsson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 79 days.

(21) Appl. No.: 17/437,877

(22) PCT Filed: Mar. 11, 2019

(86) PCT No.: PCT/EP2019/056043
§ 371 (c)(1),
(2) Date: Sep. 10, 2021

(87) PCT Pub. No.: WO2020/182291
PCT Pub. Date: Sep. 17, 2020

(65) Prior Publication Data
US 2022/0173779 A1  Jun. 2, 2022

(51) Int. Cl.
*H04B 7/04* (2017.01)
*H04B 7/06* (2006.01)
(Continued)

(52) U.S. Cl.
CPC ......... *H04B 7/0617* (2013.01); *H04B 7/0456* (2013.01); *H04B 7/0695* (2013.01); *H04B 7/088* (2013.01); *H04L 5/0007* (2013.01)

(58) Field of Classification Search
CPC .. H04B 7/0617; H04B 7/0456; H04B 7/0695; H04B 7/088; H04L 5/0007
See application file for complete search history.

(56) References Cited

U.S. PATENT DOCUMENTS 9,247,579 B1 * 1/2016 Zhang ............... H04L 1/0675
2009/0046798 A1 * 2/2009 Xia .................. H04B 7/0617
375/267

(Continued)

FOREIGN PATENT DOCUMENTS

| JP | 2013534089 A | 8/2013 |
| JP | 2016530776 A | 9/2016 |
| JP | 2018509816 A | 4/2018 |

OTHER PUBLICATIONS

Author Unknown, "Butson-type Hadamard matrix", Wikipedia, https://en.wikipedia.org/wiki/Butson-type_Hadamard_matrix, accessed Mar. 11, 2019, Dec. 7, 2017, 1-2.

(Continued)

*Primary Examiner* — Kenneth T Lam
(74) *Attorney, Agent, or Firm* — Murphy, Bilak & Homiller PLLC

(57) ABSTRACT

Methods and apparatus are provided for transmitting a symbol from a plurality of antennas. In one example, a method comprises transmitting simultaneously, from each antenna, the symbol multiplied by a respective element of a selected column of a matrix. The number of rows of the matrix is at least the number of antennas, the number of columns of the matrix is at least 6, and the matrix comprises or is a sub-matrix of a Butson-type Hadamard matrix that includes only a minimum number of non-real elements.

24 Claims, 3 Drawing Sheets

---

Transmitting simultaneously, from each antenna, the symbol multiplied by a respective element of a selected column of a matrix, wherein the number of rows of the matrix is at least the number of antennas, the number of columns of the matrix is at least 6, and the matrix comprises or is a sub-matrix of a Butson-type Hadamard matrix that includes only a minimum number of non-real elements ~402

400

(51) Int. Cl.
*H04B 7/0456* (2017.01)
*H04B 7/08* (2006.01)
*H04L 5/00* (2006.01)

(56) References Cited

U.S. PATENT DOCUMENTS

| | | | |
|---|---|---|---|
| 2011/0280188 A1 | 11/2011 | Jeon et al. | |
| 2011/0299382 A1* | 12/2011 | Van Nee | H04L 25/0242 370/210 |
| 2012/0230380 A1* | 9/2012 | Keusgen | H04B 7/0482 375/227 |
| 2015/0086217 A1* | 3/2015 | Galvanauskas | H01S 3/2383 398/188 |
| 2015/0092872 A1* | 4/2015 | Keusgen | H04L 27/2634 375/260 |
| 2021/0392660 A1* | 12/2021 | Chen | H04L 27/2613 |
| 2022/0182109 A1* | 6/2022 | Lopez | H04B 7/0695 |

OTHER PUBLICATIONS

Lampio, Pekka H. J., "Classification of difference matrices and complex Hadamard matrices", Aalto University publication series, Doctoral Dissertations, Department of Communications and Networking, Sep. 25, 2015, 1-165.

Unknown, Author, "Part 11: Wireless LAN Medium Access Control (MAC) and Physical Layer (PHY) Specifications", IEEE Std 802.11™—2016; IEEE Standard for Information technology—Telecommunications and Information exchange between systems Local and metropolitan area networks—Specific requirements, Dec. 14, 2016, 1-3534.

* cited by examiner $$\begin{pmatrix} -j & 1 & 1 & 1 & 1 & 1 \\ 1 & -j & -1 & 1 & 1 & -1 \\ 1 & -1 & -j & -1 & 1 & 1 \\ 1 & 1 & -1 & -j & -1 & 1 \\ 1 & 1 & 1 & -1 & -j & -1 \\ 1 & -1 & 1 & 1 & -1 & -j \end{pmatrix}$$

$$\begin{pmatrix} -j & 1 & 1 & 1 & 1 & 1 & 1 & 1 & 1 & 1 \\ 1 & -j & 1 & 1 & 1 & 1 & -1 & -1 & -1 & -1 \\ 1 & 1 & -j & -1 & -1 & 1 & 1 & 1 & -1 & -1 \\ 1 & 1 & -1 & -j & 1 & -1 & 1 & -1 & 1 & -1 \\ 1 & 1 & -1 & 1 & -j & -1 & -1 & 1 & -1 & 1 \\ 1 & 1 & 1 & -1 & -1 & -j & -1 & -1 & 1 & 1 \\ 1 & -1 & 1 & 1 & -1 & -1 & -j & 1 & 1 & -1 \\ 1 & -1 & 1 & -1 & 1 & -1 & 1 & -j & -1 & 1 \\ 1 & -1 & -1 & 1 & -1 & 1 & 1 & -1 & -j & 1 \\ 1 & -1 & -1 & -1 & 1 & 1 & -1 & 1 & 1 & -j \end{pmatrix}$$

$$\begin{pmatrix} -j & 1 & 1 & 1 & 1 & 1 & 1 & 1 & 1 & 1 & 1 & 1 & 1 \\ 1 & -j & -1 & 1 & -1 & -1 & 1 & 1 & 1 & 1 & -1 & -1 & 1 & -1 \\ 1 & -1 & -j & -1 & 1 & -1 & -1 & 1 & 1 & 1 & 1 & -1 & -1 & 1 \\ 1 & 1 & -1 & -j & -1 & 1 & -1 & -1 & 1 & 1 & 1 & 1 & -1 & -1 \\ 1 & -1 & 1 & -1 & -j & -1 & 1 & -1 & -1 & 1 & 1 & 1 & 1 & -1 \\ 1 & -1 & -1 & 1 & -1 & -j & -1 & 1 & -1 & -1 & 1 & 1 & 1 & 1 \\ 1 & 1 & -1 & -1 & 1 & -1 & -j & -1 & 1 & -1 & -1 & 1 & 1 & 1 \\ 1 & 1 & 1 & -1 & -1 & 1 & -1 & -j & -1 & 1 & -1 & -1 & 1 & 1 \\ 1 & 1 & 1 & 1 & -1 & -1 & 1 & -1 & -j & -1 & 1 & -1 & -1 & 1 \\ 1 & 1 & 1 & 1 & 1 & -1 & -1 & 1 & -1 & -j & -1 & 1 & -1 & -1 \\ 1 & -1 & 1 & 1 & 1 & 1 & -1 & -1 & 1 & -1 & -j & -1 & 1 & -1 \\ 1 & -1 & -1 & 1 & 1 & 1 & 1 & -1 & -1 & 1 & -1 & -j & -1 & 1 \\ 1 & 1 & -1 & -1 & 1 & 1 & 1 & 1 & -1 & -1 & 1 & -1 & -j & -1 \\ 1 & -1 & 1 & -1 & -1 & 1 & 1 & 1 & 1 & -1 & -1 & 1 & -1 & -j \end{pmatrix}$$

Transmitting simultaneously, from each antenna, the symbol multiplied by a respective element of a selected column of a matrix, wherein the number of rows of the matrix is at least the number of antennas, the number of columns of the matrix is at least 6, and the matrix comprises or is a sub-matrix of a Butson-type Hadamard matrix that includes only a minimum number of non-real elements ⸺ 402

Transmitting simultaneously, from each antenna, the symbol multiplied by a respective element of a selected row of a matrix, wherein the number of columns of the matrix is at least the number of antennas, and the number of rows of the matrix is at least 6, and the matrix comprises or is a sub-matrix of a Butson-type Hadamard matrix that includes only a minimum number of non-real elements ⸺ 502

TRANSMITTING A SYMBOL FROM A PLURALITY OF ANTENNAS

TECHNICAL FIELD

Examples of the present disclosure relate to transmitting a symbol, for example a long training field (LTF), from a plurality of antennas.

BACKGROUND

Advanced antenna systems may be used to significantly enhance performance of wireless communication systems in both uplink (UL) and downlink (DL) directions. For example, advanced antennas may provide the possibility of using the spatial domain of the channel to improve reliability and/or throughput of transmissions, for example by transmitting using multiple spatial streams (also referred to as space time streams).

The 802.11-16 standard, for example, specifies a set of matrices, often called P matrices, where the rows (and columns) define a set of orthogonal vectors that are employed as orthogonal cover codes for channel and pilot estimation when utilizing more than one space time stream (e.g. un multiple-input multiple-output, MIMO, operation). Rows or columns of these P matrices may be applied to the Long Training Field (LTF) and to pilots embedded in data symbols when transmitted. The P matrices may be for example Hadamard matrices.

A square matrix M of dimensions n×n is said to be a Hadamard matrix of Butson-type $H(q, n)$ if:
1. its entries are all powers of the q-th root of unity, and
2. $M \cdot M^H = nI$. Here, the superscript $(.)^H$ denotes Hermitian matrix transpose and I is the identity matrix.

For example, the discrete Fourier transform (DFT) matrix of order n is of Butson-type $H(n, n)$, and Hadamard matrices of Butson-type $H(2, n)$ are real and binary (i.e. have entries +1, −1).

Hadamard matrices of Butson-type $H(4, n)$ are orthogonal matrices (i.e. their rows are orthogonal vectors, and/or their columns are orthogonal vectors) whose entries consist of +1, −1, j, −j. If a matrix is of Butson-type $H(2, n)$ then n is 1, 2 or an integer multiple of 4, whereas if a matrix is of Butson-type $H(4, n)$ then n is either 1 or is an even number that is not an integer multiple of 4. It follows that there are no Hadamard matrices of Butson-type $H(2,9)$, $H(2,10)$, $H(2,13)$, $H(2,14)$, $H(4,9)$, $H(4,13)$.

It can be verified that the Butson-type $H(4, n)$ Hadamard property of a matrix is preserved when performing the following operations.
1) Negation of a row or column.
2) Multiplication of a row or column by j.
3) Permutation (i.e. swapping) of any two rows or columns.

Moreover, any Butson-type $H(4, n)$ Hadamard matrix can be transformed into a matrix whose first row and first column consist exclusively of +1's by means of these operations. Any matrix in this special form is said to be normalized. If a Hadamard matrix A of Butson-type $H(4, n)$ can be transformed into a Hadamard matrix B of Butson-type $H(4, n)$ by application of the three operations given above, then the two matrices A and B are said to be equivalent. Otherwise, the matrices are said to be non-equivalent. Any Hadamard matrix of Butson-type $H(4, n)$ is equivalent to a normalized Hadamard matrix of Butson-type $H(4, n)$. There are exactly 10 non-equivalent Butson-type $H(4,10)$ matrices and exactly 752 non-equivalent Butson-type $H(4,14)$ matrices. If M is a Hadamard matrix of Butson-type $H(4,n)$ then so is $M^T$. Here, the superscript $(.)^T$ denotes matrix transpose.

EHT (Extremely High Throughput) has been proposed as an enhancement of the IEEE 802.11 standard. In particular, EHT shall provide support for up to 16 space-time streams. Currently the IEEE 802.11-16 standard and its amendment 802.11ax support up to 8 space time streams. Hence, for example, there may be a need for matrices (e.g. P matrices) of orders $9 \le n \le 16$ to provide orthogonal cover codes for long training fields (LTFs) for up to 16 space-time streams.

The construction of P matrices for 8 or fewer space time streams is straightforward and can be done by inspection or by exhaustive computer search. However, as the dimension of the P matrix increases, exhaustive computer search becomes impractical.

SUMMARY

One aspect of the present disclosure provides a method of transmitting a symbol from a plurality of antennas. The method comprises transmitting simultaneously, from each antenna, the symbol multiplied by a respective element of a selected column of a matrix. The number of rows of the matrix is at least the number of antennas, the number of columns of the matrix is at least 6, and the matrix comprises or is a sub-matrix of a Butson-type Hadamard matrix that includes only a minimum number of non-real elements.

Another aspect of the present disclosure provides a method of transmitting a symbol from a plurality of antennas. The method comprises transmitting simultaneously, from each antenna, the symbol multiplied by a respective element of a selected row of a matrix. The number of columns of the matrix is at least the number of antennas, and the number of rows of the matrix is at least 6, and the matrix comprises or is a sub-matrix of a Butson-type Hadamard matrix that includes only a minimum number of non-real elements.

A further aspect of the present disclosure provides apparatus for transmitting a symbol from a plurality of antennas. The apparatus comprises a processor and a memory. The memory contains instructions executable by the processor such that the apparatus is operable to transmit simultaneously, from each antenna, the symbol multiplied by a respective element of a selected column of a matrix. The number of rows of the matrix is at least the number of antennas, the number of columns of the matrix is at least 6, and the matrix comprises or is a sub-matrix of a Butson-type Hadamard matrix that includes only a minimum number of non-real elements.

Another aspect of the present disclosure provides apparatus for transmitting a symbol from a plurality of antennas. The apparatus comprises a processor and a memory. The memory contains instructions executable by the processor such that the apparatus is operable to transmit simultaneously, from each antenna, the symbol multiplied by a respective element of a selected row of a matrix. The number of columns of the matrix is at least the number of antennas, and the number of rows of the matrix is at least 6, and the matrix comprises or is a sub-matrix of a Butson-type Hadamard matrix that includes only a minimum number of non-real elements.

An additional aspect of the present disclosure provides apparatus for transmitting a symbol from a plurality of antennas. The apparatus is configured to transmit simultaneously, from each antenna, the symbol multiplied by a respective element of a selected column of a matrix. The number of rows of the matrix is at least the number of antennas, the number of columns of the matrix is at least 6, and the matrix comprises or is a sub-matrix of a Butson-type Hadamard matrix that includes only a minimum number of non-real elements.

A further aspect of the present disclosure provides apparatus for transmitting a symbol from a plurality of antennas. The apparatus is configured to transmit simultaneously, from each antenna, the symbol multiplied by a respective element of a selected row of a matrix. The number of columns of the matrix is at least the number of antennas, and the number of rows of the matrix is at least 6, and the matrix comprises or is a sub-matrix of a Butson-type Hadamard matrix that includes only a minimum number of non-real elements.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 1 is an example of a Hadamard matrix of Butson-type H(4,6) having a minimum number of non-real entries;

FIG. 2 is an example of a Hadamard matrix of Butson-type H(4,10) having a minimum number of non-real entries;

FIG. 3 is an example of a Hadamard matrix of Butson-type H(4,14) having a minimum number of non-real entries;

FIG. 4 is a flow chart of an example of a method of transmitting a symbol from a plurality of antennas;

FIG. 5 is a flow chart of an example of a method of transmitting a symbol from a plurality of antennas;

DETAILED DESCRIPTION

Figure 6:
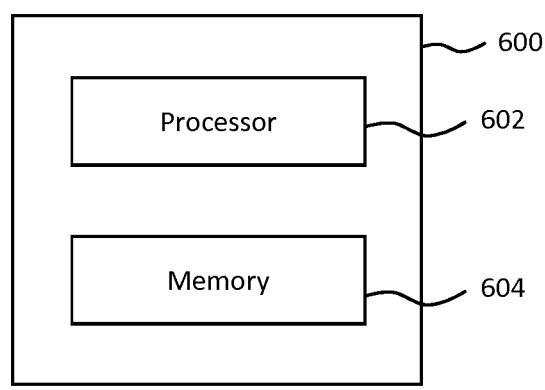
FIG. 6 shows an example of apparatus for transmitting a symbol from a plurality of antennas.
Figure 7:
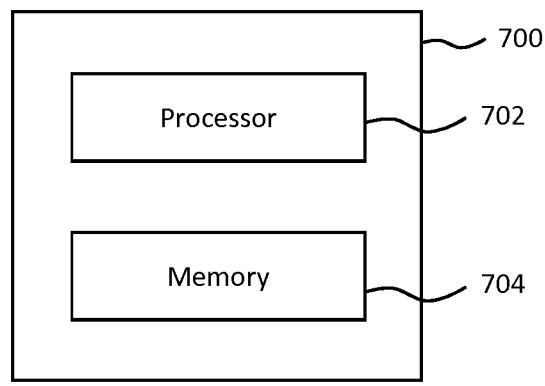
FIG. 7 shows an example of apparatus for transmitting a symbol from a plurality of antennas.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause processing circuitry to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Example embodiments of the present disclosure provide matrices wherein the rows (or alternatively the columns) are used as orthogonal cover codes, for example for long training field (LTF) or pilot symbols. For example, the matrices and associated orthogonal cover codes may support (up to) 10 and (up to) 14 space time streams. Examples of the proposed orthogonal cover codes are defined in terms of Hadamard matrices of Butson-types (4,6), (4,10) and (4,14), and the elements of these matrices consist exclusively of $+\{1, j\}$. That is, each element is +1, −1, +j or −j. Moreover, for example, for a Butson-type Hadamard matrix H(4, n), the matrix may contain only n non-real (e.g. purely imaginary, j or −j) elements respectively, which may in some examples be the minimum possible number of non-real elements. Since, for example, multiplication by j (e.g. before a symbol is transmitted) may involve only swapping of imaginary and real parts, applying matrices disclosed herein to LTF or pilot symbols may in some examples have lower computational complexity compared to using Butson-type Hadamard matrices with more non-real elements.

Proposed herein is the use of Butson-type Hadamard matrices with a minimum number of non-real elements, where each element of the matrix is one of the four values $\pm\{1, j\}$. In some examples, it may be desirable to minimize the number of non-real (e.g. purely imaginary) entries in the matrix, as real multiplications with real entries (elements) in the matrix may be less computationally complex than multiplications with non-real elements, including with elements of j and −j. The following proposition gives a lower bound on the minimum number of non-real (e.g. purely imaginary) entries in a Butson-type H(4, n) matrix.

Suppose that n>2 is an even integer not divisible by 4 (i.e. n=6, 10, 14, . . . ). Then any Hadamard matrix M of Butson-type H(4, n) has at least n purely imaginary entries. To show this, consider an arbitrary Hadamard matrix M of Butson-type H(4, n) having a number p of non-real (e.g. purely imaginary) entries. We shall suppose here that p<n, and derive a contradiction. Since, for the purposes of this contradictory example, p<n, there is at least one row that contains only real-valued entries. Denote by $\vec{a}$ a row of M consisting of real elements and denote $\vec{m}$ by in any other row of M. Now, since $\vec{a} \cdot \vec{m}^H = 0$, it follows that the number of non-real (e.g. purely imaginary) entries in $\vec{m}$ is even. Therefore p is even, p≥n−2, and M has at most p/2 rows containing purely imaginary elements. It follows that the number of real-valued rows in M is at least:

$$n - \frac{p}{2} \geq n - \frac{n-2}{2} = \frac{n}{2} + 1 \geq 4.$$

That is, M has 4 or more real-valued rows. Consider three different real-valued rows of M, say $\vec{a}$, $\vec{b}$, $\vec{c}$. By multiplying some columns of M by −1, we can assume that all the entries in d are +1's. Since $\vec{a} \cdot \vec{b}^T = 0$, it follows that n/2 entries in $\vec{b}$ are +1's while the remaining n/2 entries are −1's. By permuting columns if necessary, we can assume that the first n/2 entries in $\vec{b}$ are positive. Since $\vec{a} \cdot \vec{c}^T = 0$, it follows that the sum of the first n/2 entries of $\vec{c}$ plus the sum of the last n/2 entries of $\vec{c}$ is equal to zero. Furthermore, since $\vec{b} \cdot \vec{c}^T = 0$, it follows that the sum of the first n/2 entries of $\vec{c}$ minus the sum of the last n/2 entries of $\vec{c}$ is equal to zero. Hence the sum of the first n/2 entries of $\vec{c}$ is zero. This implies that n/2 is even, which in turn implies that n is divisible by 4, in contradiction with the hypothesis that n is not divisible by 4. This concludes that a Hadamard matrix M of Butson-type H(4,n) must have at least n purely imaginary entries.

Embodiments disclosed herein propose the use of Butson-type Hadamard matrices that have the minimum number of non-real (e.g. purely imaginary) entries, e.g. n entries for a Butson-type Hadamard matrix H(4, n). For example, in the case of up to 5 or 6 space time streams, it is proposed to use a Hadamard matrix of Butson-type H(4,6) or a sub-matrix of that matrix (particularly for up to 5 space time streams). FIG. 1 shows an example of a matrix 100 that is a Hadamard matrix of Butson-type H(4,6) having the minimum number (6) of non-real (purely imaginary in this case) entries and 30 real entries.

In the case of up to 9 or 10 space time streams, for example, it is proposed to use a Hadamard matrix of Butson-type H(4,10) or a sub-matrix of that matrix (particularly for up to 9 space time streams). FIG. 2 shows an example of a matrix 200 that is a Hadamard matrix of Butson-type H(4,10) having the minimum number (10) of non-real (purely imaginary in this case) entries and 90 real entries.

In the case of up to 13 or 14 space time streams, for example, it is proposed to use a Hadamard matrix of Butson-type H(4,14) or a sub-matrix of that matrix (particularly for up to 13 space time streams). FIG. 3 shows an example of a matrix 300 that is a Hadamard matrix of Butson-type H(4,14) having the minimum number (14) of non-real (purely imaginary in this case) entries and 182 real entries.

FIG. 4 is a flow chart of an example of a method 400 of transmitting a symbol from a plurality of antennas. In some examples, the symbol may comprise or include a long training field (LTF) symbol or one or more pilot symbols, and/or may comprise an OFDM symbol. The method comprises, in step 402, transmitting simultaneously, from each antenna, the symbol multiplied by a respective element of a selected column of a matrix. The number of rows of the matrix is at least the number of antennas, the number of columns of the matrix is at least 6, and the matrix comprises or is a sub-matrix of a Butson-type Hadamard matrix that includes only a minimum number of non-real elements. In some examples, the number of non-real elements of the matrix is equal to the number of rows and/or the number of columns of the matrix.

Thus, for example, the symbol may be transmitted and multiplied by an element from the selected column of the matrix, the element corresponding to the antenna from which the symbol is transmitted. The element may be different for each antenna, though in some examples the value of some of the elements may be the same (e.g. selected from ±1 and ±1).

In some examples, the number of space-time streams that are to be transmitted or are being transmitted is less than the order (size, number of rows/columns) of the Hadamard matrix. For example, the matrix may be a 14×14 matrix, whereas 13 space-time streams may be transmitted (e.g. using a 13×14 sub-matrix of the Butson-type Hadamard matrix). In some examples, the matrix used to provide orthogonal cover codes for 15 space-time streams may be a 15×16 matrix. In some examples, the number of space-time streams is equal to the number of antennas.

In some examples, more than one symbol is transmitted, e.g. at least the number of space-time streams. In some examples, the number of times transmission of the symbol is repeated over time (including the first transmission) is equal to the number of columns of the matrix (e.g. 14 columns for a 14×14 Butson-type Hadamard matrix). In some examples, the method 400 may comprise transmitting at least one further symbol comprising, for each further symbol, transmitting simultaneously, from each antenna, the further symbol multiplied by a respective element of a column of the matrix that is associated with the further symbol. That is, for example, as part of a training sequence, in a first time period, the symbol is transmitted and elements from a first column of the matrix are used; and for a subsequent time period, the symbol is transmitted again, and elements from a different column of the matrix are used. The symbol may in some examples be transmitted again one or more in further subsequent time periods of the training sequence using a different column of the matrix each time. Thus, for example, the selected column and each column associated with each further symbol comprise different columns of the matrix.

FIG. 5 shows an alternative example of a method 500 of transmitting a symbol from a plurality of antennas. The method 500 differs from the method 400 in that the symbol is multiplied by a respective element of a selected column, instead of a row, of the matrix. Thus the method 500 comprises, in step 502, transmitting simultaneously, from each antenna, the symbol multiplied by a respective element of a selected row of a matrix. The number of columns of the matrix is at least the number of antennas, and the number of rows of the matrix is at least 6, and the matrix comprises or is a sub-matrix of a Butson-type Hadamard matrix that includes only a minimum number of non-real elements. Any alternative described with respect to the method 400 of FIG. 4 may also be applied to the method 500 of FIG. 5, except referring to a row instead of a column and a column instead of a row where appropriate.

It should be noted that actual implementations of the method 400 or 500 may or may not use specifically a row or column of a matrix. Instead, for example, calculations or operations may be performed that effectively cause transmission of symbol as if it has been multiplied by a value that would be from a matrix that comprises or is a sub-matrix of a real Hadamard matrix of maximum excess, even if other operations, vectors and/or matrices are used instead.

In some examples, the number of antennas is at least the number of space time streams, e.g. at least 6. The matrix may comprise an 6×6, 10×10 or 14×14 matrix. For example, the matrix comprises a matrix M or a sub-matrix of M, wherein M comprises or is equivalent to one of the matrices 100-300 shown in FIGS. 1-3 respectively. For example, embodiments that use up to 10 spatial streams, and/or transmit a symbol in up to 10 different time periods, may use the matrix 200 or an equivalent.

In some examples, where the number of space time streams is up to m=9, it is proposed to use a sub-matrix of a Butson-type Hadamard matrix H(4,10) with the minimum number of non-real elements to provide orthogonal vectors to apply to a symbol (e.g. in different time periods). The matrix to use may for example be of dimension m×10 and thus may be a sub-matrix of a Butson-type Hadamard matrix (4,10). Where for example the number of space time streams is up to m=5, a sub-matrix of dimension m×6 of a Butson-type Hadamard matrix H(4,6) with the minimum number of non-real elements may be used. Where for example the number of space time streams is up to m=13, a sub-matrix of dimension m×14 of a Butson-type Hadamard matrix H(4,14) with the minimum number of non-real elements may be used.

FIG. 6 shows an example of an apparatus 600 for transmitting a symbol from a plurality of antennas. In some examples, the apparatus 600 may be configured to perform the method 400 described above with reference to FIG. 4, or any of the other examples described herein.

The apparatus 600 comprises a processor 602 and a memory 604 in communication with the processor 602. The memory 604 contains instructions executable by the processor 602. In one embodiment, the memory 604 containing instructions executable by the processor 602 such that the apparatus 600 is operable to transmit simultaneously, from each antenna, the symbol multiplied by a respective element of a selected column of a matrix. The number of rows of the matrix is at least the number of antennas, the number of columns of the matrix is at least 6, and the matrix comprises or is a sub-matrix of a Butson-type Hadamard matrix that includes only a minimum number of non-real elements.

FIG. 700 shows an example of an apparatus 700 for transmitting a symbol from a plurality of antennas. In some examples, the apparatus 700 may be configured to perform the method 500 described above with reference to FIG. 5, or any of the other examples described herein.

The apparatus 700 comprises a processor 702 and a memory 704 in communication with the processor 702. The memory 704 contains instructions executable by the processor 702. In one embodiment, the memory 704 containing instructions executable by the processor 702 such that the apparatus 700 is operable to transmit simultaneously, from each antenna, the symbol multiplied by a respective element of a selected row of a matrix. The number of columns of the matrix is at least the number of antennas, and the number of rows of the matrix is at least 6, and the matrix comprises or is a sub-matrix of a Butson-type Hadamard matrix that includes only a minimum number of non-real elements.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. An apparatus for transmitting a symbol from a plurality of antennas, the apparatus comprising a processor and a memory, the memory containing instructions executable by the processor such that the apparatus is configured to:
   transmit simultaneously, from each antenna, the symbol multiplied by a respective element of a selected column of a matrix;
   wherein the number of rows of the matrix is at least the number of the antennas, the number of columns of the matrix is at least 6, and the matrix comprises or is a sub-matrix of a Butson-type Hadamard matrix that includes only a minimum number of non-real elements;
   wherein the number of non-real elements of the matrix is equal to the number of rows and/or the number of columns of the matrix.

2. The apparatus of claim 1, wherein the memory contains instructions executable by the processor such that the apparatus is configured to:
   transmit at least one further symbol by, for each further symbol, transmitting simultaneously, from each antenna, the further symbol multiplied by a respective element of a column of the matrix that is associated with the further symbol.

3. The apparatus of claim 2, wherein the selected column and each column associated with each further symbol comprise different columns of the matrix.

4. The apparatus of claim 2, wherein the symbol and the at least one further symbol comprise at least 6 Orthogonal Frequency Division Multiplexing (OFDM) symbols.

5. The apparatus of claim 1, wherein the number of the antennas is at least 5.

6. The apparatus of claim 1, wherein the matrix comprises a 6×6, 10×10 or 14×14 matrix.

7. The apparatus of claim 1, wherein the matrix comprises a matrix M or a sub-matrix of M, wherein M comprises or is equivalent to:

$$\begin{pmatrix} -j & 1 & 1 & 1 & 1 & 1 \\ 1 & -j & -1 & 1 & 1 & -1 \\ 1 & -1 & -j & -1 & 1 & 1 \\ 1 & 1 & -1 & -j & -1 & 1 \\ 1 & 1 & 1 & -1 & -j & -1 \\ 1 & -1 & 1 & 1 & -1 & -j \end{pmatrix}$$

8. The apparatus of claim 1, wherein the matrix comprises a matrix M or a sub-matrix of M, wherein M comprises or is equivalent to:

$$\begin{pmatrix} -j & 1 & 1 & 1 & 1 & 1 & 1 & 1 & 1 \\ 1 & -j & 1 & 1 & 1 & 1 & -1 & -1 & -1 & -1 \\ 1 & 1 & -j & -1 & -1 & 1 & 1 & 1 & -1 & -1 \\ 1 & 1 & -1 & -j & 1 & -1 & 1 & -1 & 1 & -1 \\ 1 & 1 & -1 & 1 & -j & -1 & -1 & 1 & -1 & 1 \\ 1 & 1 & 1 & -1 & -1 & -j & -1 & -1 & 1 & 1 \\ 1 & -1 & 1 & 1 & -1 & -1 & -j & 1 & 1 & -1 \\ 1 & -1 & 1 & -1 & 1 & -1 & 1 & -j & -1 & 1 \\ 1 & -1 & -1 & 1 & -1 & 1 & 1 & -1 & -j & 1 \\ 1 & -1 & -1 & -1 & 1 & 1 & -1 & 1 & 1 & -j \end{pmatrix}$$

9. The apparatus of claim 1, wherein the matrix comprises a matrix M or a sub-matrix of M, wherein M comprises or is equivalent to:

$$\begin{pmatrix} -j & 1 & 1 & 1 & 1 & 1 & 1 & 1 & 1 & 1 & 1 & 1 & 1 \\ 1 & -j & -1 & 1 & -1 & -1 & 1 & 1 & 1 & -1 & -1 & 1 & -1 \\ 1 & -1 & -j & -1 & 1 & -1 & -1 & 1 & 1 & 1 & -1 & -1 & 1 \\ 1 & 1 & -1 & -j & -1 & 1 & -1 & -1 & 1 & 1 & 1 & -1 & -1 \end{pmatrix}$$

-continued $$\begin{pmatrix} 1 & -1 & 1 & -1 & -j & -1 & 1 & -1 & -1 & 1 & 1 & 1 & -1 \\ 1 & -1 & -1 & 1 & -1 & -j & -1 & 1 & -1 & -1 & 1 & 1 & 1 \\ 1 & 1 & -1 & -1 & 1 & -1 & -j & -1 & 1 & -1 & -1 & 1 & 1 \\ 1 & 1 & 1 & -1 & -1 & 1 & -1 & -j & -1 & 1 & -1 & -1 & 1 \\ 1 & 1 & 1 & 1 & -1 & -1 & 1 & -1 & -j & -1 & 1 & -1 & -1 \\ 1 & 1 & 1 & 1 & 1 & -1 & -1 & 1 & -1 & -j & -1 & 1 & -1 \\ 1 & -1 & 1 & 1 & 1 & 1 & -1 & -1 & 1 & -1 & -j & -1 & 1 \\ 1 & -1 & -1 & 1 & 1 & 1 & -1 & -1 & 1 & -1 & -j & -1 & 1 \\ 1 & 1 & -1 & -1 & 1 & 1 & 1 & -1 & -1 & 1 & -1 & -j & -1 \\ 1 & -1 & 1 & -1 & -1 & 1 & 1 & 1 & -1 & -1 & 1 & -1 & -j \end{pmatrix}$$

10. The apparatus of claim 1, wherein the symbol comprises an Orthogonal Frequency Division Multiplexing (OFDM) symbol.

11. The apparatus of claim 1, wherein the symbol comprises a long training field (LTF) symbol.

12. An apparatus for transmitting a symbol from a plurality of antennas, the apparatus comprising processor and a memory, the memory containing instructions executable by the processor such that the apparatus is configured to:
transmit simultaneously, from each antenna, the symbol multiplied by a respective element of a selected row of a matrix;
wherein the number of columns of the matrix is at least the number of the antennas, and the number of rows of the matrix is at least 6, and the matrix comprises or is a sub-matrix of a Butson-type Hadamard matrix that includes only a minimum number of non-real elements;
wherein the number of non-real elements of the matrix is equal to the number of rows and/or the number of columns of the matrix.

13. The apparatus of claim 12, wherein the memory contains instructions executable by the processor such that the apparatus is configured to:
transmit at least one further symbol comprising, for each further symbol, transmitting simultaneously, from each antenna, the further symbol multiplied by a respective element of a row of the matrix that is associated with the further symbol.

14. The apparatus of claim 13, wherein the selected row and each row associated with each further symbol comprise different rows of the matrix.

15. The apparatus of claim 13, wherein the symbol and the at least one further symbol comprise at least 6 OFDM symbols.

16. The apparatus of claim 12, wherein the number of the antennas is at least 5.

17. The apparatus of claim 12, wherein the matrix comprises a 6×6, 10×10 or 14×14 matrix.

18. The apparatus of claim 12, wherein the matrix comprises a matrix M or a sub-matrix of M, wherein M comprises or is equivalent to:

$$\begin{pmatrix} -j & 1 & 1 & 1 & 1 & 1 \\ 1 & -j & -1 & 1 & 1 & -1 \\ 1 & -1 & -j & -1 & 1 & 1 \end{pmatrix}$$

-continued $$\begin{pmatrix} 1 & 1 & -1 & -j & -1 & 1 \\ 1 & 1 & 1 & -1 & -j & -1 \\ 1 & -1 & 1 & 1 & -1 & -j \end{pmatrix}$$

19. The apparatus of claim 12, wherein the matrix comprises a matrix M or a sub-matrix of M, wherein M comprises or is equivalent to:

$$\begin{pmatrix} -j & 1 & 1 & 1 & 1 & 1 & 1 & 1 & 1 & 1 \\ 1 & -j & 1 & 1 & 1 & -1 & -1 & -1 & -1 & -1 \\ 1 & 1 & -j & -1 & -1 & 1 & 1 & 1 & -1 & -1 \\ 1 & 1 & -1 & -j & 1 & -1 & 1 & -1 & 1 & -1 \\ 1 & 1 & -1 & 1 & -j & -1 & -1 & 1 & -1 & 1 \\ 1 & 1 & 1 & -1 & -1 & -j & -1 & -1 & 1 & 1 \\ 1 & -1 & 1 & 1 & -1 & -1 & -j & 1 & 1 & -1 \\ 1 & -1 & 1 & -1 & 1 & -1 & 1 & -j & -1 & 1 \\ 1 & -1 & -1 & 1 & -1 & 1 & 1 & -1 & -j & 1 \\ 1 & -1 & -1 & -1 & 1 & 1 & -1 & 1 & 1 & -j \end{pmatrix}$$

20. The apparatus of claim 12, wherein the matrix comprises a matrix M or a sub-matrix of M, wherein M comprises or is equivalent to:

$$\begin{pmatrix} -j & 1 & 1 & 1 & 1 & 1 & 1 & 1 & 1 & 1 & 1 & 1 & 1 & 1 \\ 1 & -j & -1 & 1 & -1 & -1 & 1 & 1 & 1 & -1 & -1 & 1 & -1 \\ 1 & -1 & -j & -1 & 1 & -1 & -1 & 1 & 1 & 1 & 1 & -1 & -1 & 1 \\ 1 & 1 & -1 & -j & -1 & 1 & -1 & -1 & 1 & 1 & 1 & 1 & -1 & -1 \\ 1 & -1 & 1 & -1 & -j & -1 & 1 & -1 & -1 & 1 & 1 & 1 & 1 & -1 \\ 1 & -1 & -1 & 1 & -1 & -j & -1 & 1 & -1 & -1 & 1 & 1 & 1 & 1 \\ 1 & 1 & -1 & -1 & 1 & -1 & -j & -1 & 1 & -1 & -1 & 1 & 1 & 1 \\ 1 & 1 & 1 & -1 & -1 & 1 & -1 & -j & -1 & 1 & -1 & -1 & 1 & 1 \\ 1 & 1 & 1 & 1 & -1 & -1 & 1 & -1 & -j & -1 & 1 & -1 & -1 & 1 \\ 1 & 1 & 1 & 1 & 1 & -1 & -1 & 1 & -1 & -j & -1 & 1 & -1 & -1 \\ 1 & -1 & 1 & 1 & 1 & 1 & -1 & -1 & 1 & -1 & -j & -1 & 1 & -1 \\ 1 & -1 & -1 & 1 & 1 & 1 & 1 & -1 & -1 & 1 & -1 & -j & -1 & 1 \\ 1 & 1 & -1 & -1 & 1 & 1 & 1 & 1 & -1 & -1 & 1 & -1 & -j & -1 \\ 1 & -1 & 1 & -1 & -1 & 1 & 1 & 1 & 1 & -1 & -1 & 1 & -1 & -j \end{pmatrix}$$

21. The apparatus of claim 12, wherein the symbol comprises an Orthogonal Frequency Division Multiplexing (OFDM) symbol.

22. The apparatus of claim 12, wherein the symbol comprises a long training field (LTF) symbol.

23. A method of transmitting a symbol from a plurality of antennas, the method comprising:
transmitting simultaneously, from each antenna, the symbol multiplied by a respective element of a selected column of a matrix;
wherein the number of rows of the matrix is at least the number of the antennas, the number of columns of the matrix is at least 6, and the matrix comprises or is a sub-matrix of a Butson-type Hadamard matrix that includes only a minimum number of non-real elements;

wherein the number of non-real elements of the matrix is equal to the number of rows and/or the number of columns of the matrix.

24. A method of transmitting a symbol from a plurality of antennas, the method comprising:

transmitting simultaneously, from each antenna, the symbol multiplied by a respective element of a selected row of a matrix;

wherein the number of columns of the matrix is at least the number of the antennas, and the number of rows of the matrix is at least 6, and the matrix comprises or is a sub-matrix of a Butson-type Hadamard matrix that includes only a minimum number of non-real elements;

wherein the number of non-real elements of the matrix is equal to the number of rows and/or the number of columns of the matrix.

* * * * *